Patented Mar. 24, 1925.

1,531,123

UNITED STATES PATENT OFFICE.

ALWIN MITTASCH AND WILHELM MICHAEL, OF LUDWIGSHAFEN-ON-THE-RHINE, GERMANY, ASSIGNORS TO BADISCHE ANILIN- & SODA-FABRIK, OF LUDWIGSHAFEN-ON-THE-RHINE, GERMANY, A CORPORATION OF GERMANY.

MANUFACTURE OF ALKALI-METAL CYANIDE.

No Drawing.   Application filed March 5, 1924. Serial No. 697,137.

*To all whom it may concern:*

Be it known that we, ALWIN MITTASCH and WILHELM MICHAEL, citizens of the German Empire, residing at Ludwigshafen-on-the-Rhine, Germany, have invented new and useful Improvements in the Manufacture of Alkali-Metal Cyanide, of which the following is a specification.

This invention relates to the production of commercially pure alkali metal cyanide from gases containing hydrogen cyanide especially such gases as contain hydrogen cyanide in mixture with carbon dioxid. Such gases as for instance are obtained by the catalytic reaction between carbon monoxide and ammonia and which generally still contain a certain amount of unaltered ammonia besides hydrogen cyanide and carbon dioxid, can be worked up only with difficulty with a view to obtain commercially pure alkali metal cyanide which is not spoiled by large admixtures of alkali metal carbonates.

We have found that gas mixtures containing hydrogen cyanide and carbon dioxid can be worked up to form commercially pure cyanide very simply by introducing the gas mixture into a caustic soda solution which has a high concentration and may even contain solid sodium hydroxid and maintaining the temperature preferably below about 40 degrees centigrade. Sodium cyanide and carbonate are formed, and when the concentration of the caustic soda solution is sufficiently high the carbonate will for the chief part be precipitated at once. A sodium cyanide solution is obtained which contains comparatively little sodium carbonate. In order to obtain sodium cyanide in a state of purity as is required for trading, we saturate the cyanide solution with ammonia either after removing the sodium carbonate which has been precipitated directly or in the presence thereof. By the action of the ammonia a further precipitation of sodium carbonate takes place and the solution of practically pure sodium cyanide can then be worked up in order to obtain solid cyanide by distilling off the ammonia contained therein and evaporating to dryness.

The process forming the subject of the present invention is further explained by the following example to which however the invention is not limited.

A gas mixture produced by the catalytic interaction of carbon monoxid and ammonia containing about equal volumes of carbon dioxid and hydrogen cyanide and besides certain amounts of ammonia, water vapor and carbon monoxid, is introduced into saturated caustic soda solution, while preventing the temperature raising above about 40 degrees centigrade. The caustic soda solution should be strong enough to enable a concentration of cyanide corresponding to about 450 to 500 grams in each litre to be reached and in case of need, solid sodium hydroxid should be added to the solution. When the solution is saturated with the gases introduced, it consists of a concentrated solution of sodium cyanide with small contents of dissolved sodium carbonate, while by far the greatest quantity of the sodium carbonate has been precipitated. The solution is now saturated with gaseous ammonia without previously removing the sodium carbonate precipitated and while cooling in case the temperature should rise too much. A further amount of dissolved sodium carbonate is precipitated thereby and the solution of sodium cyanide will generally only contain a fraction of 1 per cent by weight of sodium carbonate calculated on the quantity of dissolved cyanide. The solution and the crystals are then separated by filtration and the ammonia contained in the solution is distilled off by raising the temperature very slowly, and finally the solution is evaporated to dryness in vacuo at about 50 degrees centigrade.

Under certain circumstances, especially when the gas mixture contains a substantial amount of gaseous ammonia and when the temperature during the treatment with caustic soda solution is kept very low, and if a very concentrated solution of cyanide is produced, the ammonia supplied by the gas mixture may be sufficient to cause far-going precipitation of sodium carbonate when the alkali is neutralized so that a separate addition of gaseous ammonia may be entirely dispensed with, and a cyanide solution practically free from carbonate is at once obtained.

The sodium carbonate which contains a certain amount of adherent cyanide solution and sometimes also a small amount of precipitated solid sodium cyanide, may be purified by adding water or aqueous ammonia in an amount corresponding to about double or triple the weight of the cyanide contained in the carbonate and stirring thoroughly. The solution formed containing cyanide and a small quantity of sodium carbonate is filtered off and may be added to a fresh batch of sodium cyanide solution to be treated with ammonia. The solid sodium carbonate is again washed with a small quantity of strong aqueous ammonia in order to completely remove the cyanide still present. The washing liquid obtained thereby can also be used in the course of the operations for example for preparing the caustic soda solution.

What we claim is:—

1. The process of manufacturing commercially pure sodium cyanide which consists in introducing a gas mixture containing hydrogen cyanide into highly concentrated caustic soda solution, saturating with gaseous ammonia, removing the salts precipitated thereby, if any, and then evaporating to dryness.

2. The process of manufacturing commercially pure sodium cyanide which consists in introducing a gas mixture containing hydrogen cyanide and carbon dioxid into highly concentrated caustic soda solution, saturating with gaseous ammonia, removing the salts precipitated thereby, and then evaporating to dryness.

3. The process of manufacturing commercially pure sodium cyanide which consists in introducing a gas mixture containing hydrogen cyanide, carbon dioxid and ammonia into highly concentrated caustic soda solution, saturating with gaseous ammonia, removing the salts precipitated thereby and then evaporating to dryness.

4. The process of manufacturing commercially pure sodium cyanide which consists in introducing a gas mixture containing hydrogen cyanide, carbon dioxid and ammonia into highly concentrated caustic soda solution while maintaining a temperature not exceding 40 degrees centigrade, saturating with gaseous ammonia, removing the salts precipitated thereby and then evaporating to dryness.

5. The process of manufacturing commercially pure sodium cyanide which consists in introducing a gas mixture containing hydrogen cyanide, carbon dioxid and a substantial amount of ammonia into highly concentrated caustic soda solution until the alkali is combined with hydrogen cyanide and carbon dioxid, separating the solid sodium carbonate formed and evaporating the solution to dryness.

In testimony whereof we have hereunto set our hands.

ALWIN MITTASCH.
WILHELM MICHAEL.

Witnesses:
WILHELM SCHEVER,
ARTHUR DENONVILLE.